UNITED STATES PATENT OFFICE.

CAIRY CLYDE CONOVER AND ALFRED NICKS DETWEILER, OF SPRINGFIELD, ILLINOIS.

METHOD OF RECOVERING CLAY AND SLAG FROM USED RETORTS.

1,207,503.  Specification of Letters Patent.  Patented Dec. 5, 1916.

No Drawing.  Application filed June 27, 1916. Serial No. 106,225.

*To all whom it may concern:*

Be it known that we, CAIRY C. CONOVER and ALFRED N. DETWEILER, citizens of the United States, residing in the city of Springfield, county of Sangamon, and State of Illinois, have invented certain new and useful Improvements in Methods of Recovering Clay and Slag from Used Retorts; and we do hereby declare the following to be a full, clear, and exact description of the invention, such as will enable others skilled in the art to which it appertains to make and use the same.

The present invention has for its object to provide an improved method of treating old clay retorts, crucibles and the like to separate the slag from the retort clay, so that either or both may be subsequently used for purposes hereinafter set forth.

Heretofore old clay retorts, such as those used in the process of distilling zinc have been discarded as being useless, because after the distillation process, the retort is often bent, broken, or otherwise damaged and is coated on its inner side with a relatively thick layer of slag. If the furnace in which the retort is heated is coal-fired, there may be, in addition to this inner layer of slag, a coating of slag on the outside of the retort, but this outer coating or layer is of a different nature from the inner coating, as the inner coating contains some of the valuable metallic constituents taken from the treated ore. Where the nature of the inner coating of slag justifies such a procedure, it is sometimes chipped by hand from the retort and then sent to smelters where the metallic values are recovered. This process of chipping the inner layer of slag from the retort is, of course, a slow and expensive procedure and has only been resorted to where the metallic constituents were of sufficient value to make it worth while to resort to this cumbersome method of recovering the slag. The retort from which the slag is thus removed by the chipping process is usually discarded as being of no value.

According to the present process, the slag is thoroughly separated from the retort by a reliable and inexpensive procedure which enables the valuable portion of the slag to be used for the recovery therefrom of the metallic values and the retort itself to be used, if desired, in the manufacture of new retorts for subsequent use, or other clay products.

As will hereinafter appear, the present process also renders it possible to separate the valuable slag which comprises most of the above-mentioned inner coating from the worthless slag which may comprise some of the inner coating and the outer coating, where the latter is present. It is, therefore, possible to obtain three products, to wit, a pure clay free from slag which may be used, if desired, in the manufacture of other retorts, or other clay products, a valuable slag which may be sent to smelters for the recovery of its metallic constituents, and a worthless slag which may be discarded. It is true that in the process of distilling zinc, the retort absorbs more or less of the zinc, but this does not detract from the value of the recovered clay for making new retorts.

In the preferred form of the process, the used retort with its coating or coatings of slag is crushed and then the slag is separated from the comminuted mass by means of magnetic separators.

It has been discovered that all of the metallic constituents in the slag possess more or less magnetic permeability before sufficient oxidation takes place to destroy such magnetic permeability. The slag during the distilling process is in a strong reducing atmosphere and this probably accounts for the resulting magnetic properties of the metallic constituents in the slag. If, however, after the distilling process, the retort be allowed to stand for any length of time, the resulting oxidation of the metallic constituents alters the magnetic permeability and some of the metallic values lose their magnetic properties. It is, therefore, essential that the present process be performed upon the used retort before sufficient oxidation has taken place to materially alter the magnetic properties of the metallic values, because, as above stated, the slag is separated from the retort clay by magnetic separators. The used retort is, therefore, crushed, preferably to pass a 2-mesh screen, as soon as it has cooled and before sufficient oxidation takes place to alter the magnetic permeability of the metallic values.

After crushing, the comminuted mass is subjected to the action of a magnetic separator which preferably has but a relatively small magnetic influence. By this step, the constituents of the slag which possess a high degree of magnetic permeability, such as iron, are separated from the comminuted mass. The remaining material is then crushed to a finer state, preferably not finer than 40-mesh screen. After the second crushing operation, the material is subjected to the action of a second magnetic separator or concentrator of greater strength than the first magnetic separator and which has the effect of separating more of the valuable slag. The two slag products obtained from these magnetic separators contain the metallic values and represent most of the above-mentioned inner slag coating of the retort. The product representing the worthless coating of slag is then separated from the remaining material by means of a third magnetic separator which has sufficient magnetic influence to separate all of the worthless slag from the retort clay, thus leaving the latter in a pure state capable of being used in the manufacture of new retorts.

It will now be seen that if there exists on the retort, two kinds of slag, to wit, a slag containing valuable metallic constituents and a worthless slag, the valuable slag may be separated from the worthless slag and these two qualities of slag in turn separated from the retort clay to leave the latter in a pure and reusable state. In case the inner slag is valueless, that is, does not contain metallic constituents of sufficient value to warrant subsequent metallurgical treatment, the use of the second magnetic separator may be omitted, but in any case, at least one magnetic separator is employed which should have sufficient magnetic influence to separate out the feebly magnetic material. The slag containing the valuable metallic constituents may then be treated to recover the metallic values and the retort clay may be used in the manufacture of new retorts, or for making any other clay products desired.

In case metallic values other than zinc do not occur in the ore, the recovered slag will not be of value and, hence, there is produced by the present process, a worthless slag but a valuable clay. Therefore, whether or not the recovered slag is valuable for its metallic constituents, the present process renders it possible to separate the slag from the retort clay and the latter may be used in the manufacture of new retorts, or other clay products, irrespective of the value of the recovered slag. The value of the recovered slag will, of course, depend upon the character of the ore and this will determine whether or not all of the recovered slag, or a portion thereof, is to be subsequently treated for the recovery of its metallic values. Furthermore, the present process will be found valuable for separating some or all of the slag for subsequent metallurgical treatment, even if the clay is discarded and not used in the subsequent manufacture of clay products. Whether or not the slag and clay are subsequently used after their separation is immaterial to the present invention, for if either is used and the other discarded, the process will be found valuable for recovering whichever one of the products that is subsequently utilized.

As above stated, it has been the general practice to discard the used retorts, although the cleaner retorts have sometimes been used in making other fire-clay material which does not have to stand the high temperatures to which the retorts are subjected. Heretofore it has been impossible to remove all of the slag, even by the above-described chipping method, and the unremoved slag which is present in the clay, lowers its melting or bending point so that it is much inferior to new clay and not serviceable in the manufacture of retorts. According to the present process, however, the recovered clay is substantially as pure as the new clay originally employed in the manufacture of the retorts and the remade retorts are just as serviceable as retorts made from new clay.

It is to be noted that the magnetic separators must be used before sufficient oxidation has taken place to materially alter or destroy the magnetic permeability of the metallic constituents of the slag, inasmuch as after oxidation most of the metallic constituents lose their magnetic permeability, and thus cannot be separated by means of the magnetic concentrators.

It is to be noted that the term "slag" herein used is intended to refer to the residual coating on the retort, which coating collects on the retort in the zinc smelting furnaces and which consists principally of true slag, inasmuch as it is a fused vitrified mass, together with metallic particles and matte.

What we claim is:—

1. The method of treating old clay retorts to separate the clay from the slag, which consists in crushing the retort and the adhering slag, and magnetically separating the slag from the retort clay.

2. The method of treating old clay retorts to separate the clay from the slag, which consists in crushing the retort and the adhering slag, and magnetically separating the slag from the retort clay before the magnetic properties of the slag constituents have been materially altered through oxidation.

3. The method of treating old clay retorts to separate the clay from the slag, which consists in crushing the retort and the adhering slag, and magnetically separating the slag from the retort clay before the slag constituents have materially oxidized.

4. The method of treating old clay retorts to separate the clay from the slag, which consists in crushing the retort and the adhering slag, subjecting the crushed mass to magnetic influence of a predetermined strength to separate some of the slag, further crushing the remaining mass, and then subjecting the same to a greater magnetic influence to separate more of the slag, for the purpose described.

5. The method of treating clay retorts which have been used in the distillation of zinc, to separate the clay from the slag, which consists in crushing the retort and adhering slag and magnetically removing the metal values of the slag of greater magnetic permeability, and then removing the metal values of the slag of lesser magnetic permeability.

6. The method of treating old retorts to separate the clay from the slag, which consists in crushing the retort and the adhering slag and removing the metal values from the slag in the order of their decrease of magnetic permeability.

7. The method of treating clay retorts to separate the clay from the slag which comprises elements having various and declining degrees of magnetic permeability, which includes the crushing of the retort and the adhering slag, the magnetic separating of the magnetic element of greater permeability before its permeability declines to a predetermined point, and the magnetic separating of the element of lesser permeability before its permeability declines to a predetermined point.

In testimony whereof we affix our signatures.

CAIRY CLYDE CONOVER.
ALFRED NICKS DETWEILER.